Figure 1:
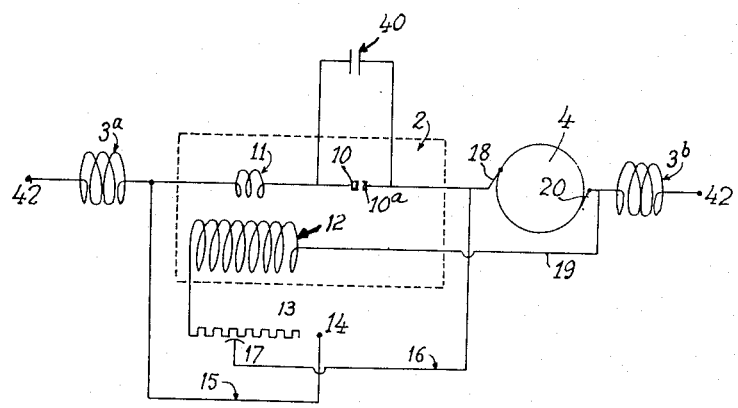

Nov. 15, 1955   C. DE LA SOURCE   2,724,081
SPEED VARIATOR FOR AN ELECTRIC MOTOR
Filed June 30, 1953   2 Sheets-Sheet 1

Charles de la Source
INVENTOR
By Richardson, David and Norton
his Att'ys

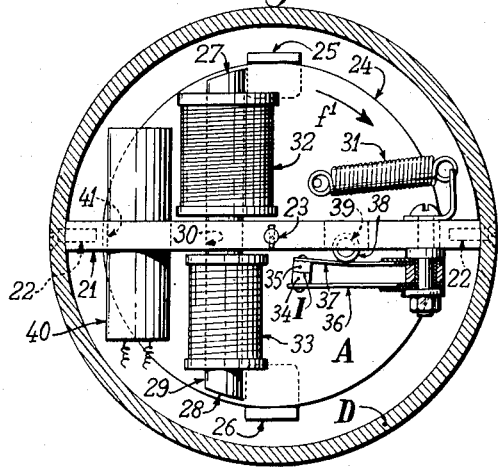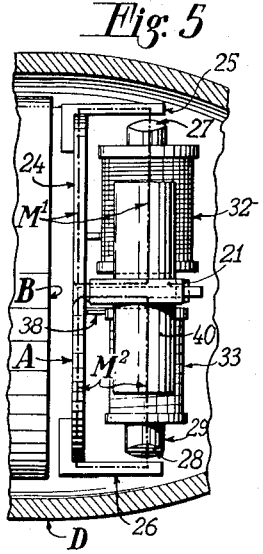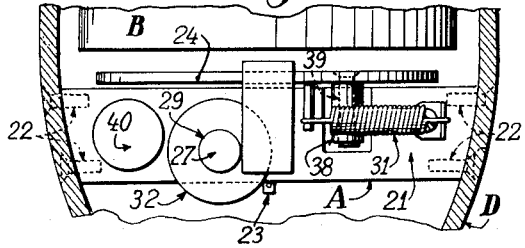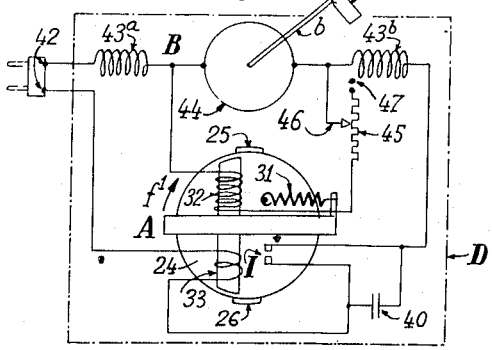

United States Patent Office 2,724,081
Patented Nov. 15, 1955

2,724,081

SPEED VARIATOR FOR AN ELECTRIC MOTOR

Charles de la Source, Paris, France, assignor to Societe les Fils de Peugeot Freres, Valentigney, France, a French body corporate Application June 30, 1953, Serial No. 365,073

Claims priority, application France July 8, 1952

5 Claims. (Cl. 318—308)

The present invention has for object to provide a speed variator for small power D. C. or A. C. electric motors. This speed variator permits the speed of the motor to be easily adjusted either before the motor has been started up or during the operation thereof in such manner that this speed tends automatically to maintain itself at a fixed value.

The invention has especially for object to provide a speed variator which comprises in combination an electric switch whose movable member is operated by an electromagnet provided with two coils adapted to act differentially on this member which is itself adapted to control this switch.

A further object of the invention is to provide a combination of this speed variator and an electric motor.

Figure 2:
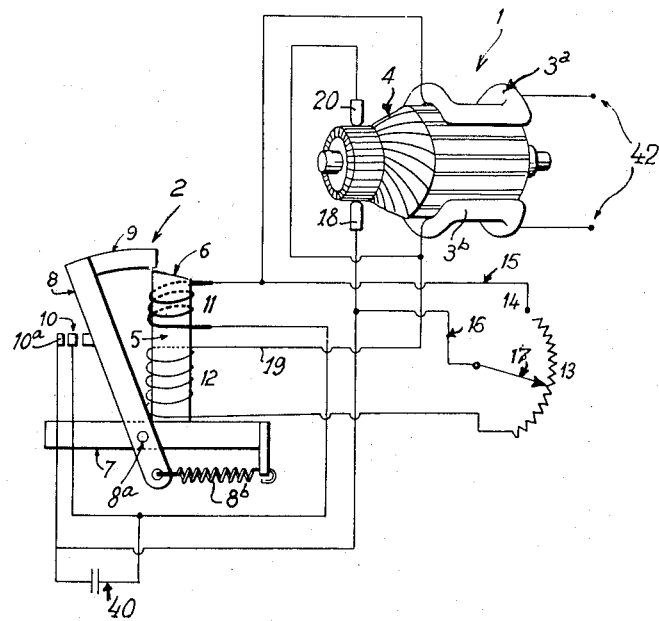

Other features and advantages of the invention will be apparent from the ensuing description. In the drawings, given merely by way of example:

Fig. 1 represents the circuit diagram of the combination according to the invention comprising a series motor and a speed variator, Fig. 2 represents in greater detail the same combination and one embodiment of the speed variator, Fig. 3 represents the circuit diagram of another combination according to the invention comprising a series motor and a speed variator therefor, Fig. 4 is an end view of this speed variator, and Figs. 5 and 6 are the corresponding side elevational and plan views thereof.

In the embodiment shown in Figs. 1 and 2, a universal motor 1 is provided with a speed variator 2 and comprises two field windings 3ª, 3ᵇ and an armature 4. The speed variator 2 comprises a magnetic circuit consisting of a cylindrical core 5, a support 7 and an armature 8 oscillably mounted at 8ª on this support. This armature is provided at its free end with a foot 9 in the shape of an arc of a circle the centre of which is situated on the axis 8ª. The end 6 of the core 5 is shaped in the form of a portion of a cylinder having as axis the axis 8ª, so that the foot 9 is concentric with this end 6.

The movable armature 8 is capable of oscillating between two positions. In the first of these positions this armature is situated in front of the core 5 and is attracted thereby, and in the second position it bears against the stud 10 of a switch having two contact studs 10 and 10ª and thus closes this switch; the latter tends to open when the armature 8 leaves the stud 10. A spring 8ᵇ, hooked to the support 7 and to the armature 8, tends to urge the latter against the stud 10.

On the core 6 are wound: a first coil 11 which is in series with the feed circuit of the motor 1, and a second coil 12 connected in parallel with the armature 4 of the motor. The two contact studs 10 and 10ª are connected in series with the coil 11 and the feed circuit of the motor 1. A rheostat 13 is connected in series with the coil 12. This rheostat comprises a dead stud 14 with which it is possible to short-circuit the speed variator through conductors 15 and 16. The conductor 16 normally serves to connect the slider 17 of the rheostat 13 to one of the brushes 18 of the armature 4, and a conductor 19 connects the coil 12 directly to the other brush 20. The coil 11 is wound in the opposite direction to coil 12 so that the flux created thereby has a subtractive effect on the flux of the latter. These two fluxes, therefore, act differentially.

The above-described assembly operates in the following manner:

If the slider 17 of the rheostat 13 is brought to the dead stud 14, the speed variator, and in particular its switch, is short-circuited and the motor, without any adjustment, functions as a normal motor. When it is desired to make use of the speed variator 2, the current in the coil 12 is adjusted, by shifting the slider 17 of the rheostat 13, until the vibrator functions at a frequency resulting in a motor torque corresponding to the desired speed of rotation of the motor armature. When the flux in the magnetic circuit of the vibrator is sufficient for the action of the core 6 on the armature 8 to exceed that of the spring 8ᵇ, the armature 8 is attracted by the core 6. As soon as the armature 8 leaves the contact stud 10, the contact studs 10 and 10ª separate and the motor circuit is opened, i. e. switched off. The armature 8 is thereupon subject to the action of the spring 8ᵇ alone and is urged towards the switch 10, 10ª which it once more closes, and so on. It is obvious that the frequency or rate of opening and closing the circuit depends on the total flux in the vibrator's magnetic circuit.

If the motor speed decreases owing to for example an increase in the load, the current in the coil 11 increases. The subtractive effect it has on the coil 12 increases and the core 5 attracts the armature 8 with more force and the frequency at which the latter oscillates about the centre 8ª increases. Hence the energy supplied to the motor 1 is increased and, due to the increased torque, the speed of the armature regains the value for which it was set (that is, within the limits of armature slip).

If it is desired to modify the speed of the motor, i. e. the frequency of the oscillations of the vibrator, the slider 17 of the rheostat 13 is shifted. It is obvious of course that adjustment can equally be made to the air gap between the armature 8, 9 and the end 6 of the core 5, and to the tension of the spring 8ᵇ.

A capacitor 40 has been connected in parallel with the contact studs 10, 10ª, in order to reduce the spark when switching.

Figs. 3 to 6 show another embodiment of the invention which presents a number of advantages over the above-described assembly. In this embodiment the speed variator A is combined with a motor B (Fig. 3). The shaft b of this motor B drives a device c (such as for example a blade in a coffee grinder) or any other domestic appliance. The assembly of the variator A and the motor B is enclosed in a casing D. The speed variator A comprises a support comprising a metal bar 21 adapted to be fixed to the motor support, that is, in the illustrated example, to the casing D by means of screws 22. In the bar 21, along the median tranverse axis thereof, is rotatively mounted a journal 23 which is integral with a circular metal disc 24. Two L-shaped lugs 25 and 26 are attached to this disc and are diametrally disposed relative to the centre of the latter. The long arms of these lugs extend parallelly to the axis of the journal 23 on the same side of the disc as this journal. These lugs cooperate with one or other of the ends 27 and 28 of a metal cylindrical core 29 which is a tight fit in an aperture 30 provided in the support bar 21. This core is so arranged that in the illustrated mean position of the disc 24 this core has its ends situated outside the geometric cylinder through the lugs 25 and 26. It will be observed that the faces of the ends 27 and 28 are in the shape of portions of a cylinder the axis of which coincides with that of the journal 23.

This assembly forms two magnetic circuits represented in Fig. 5 by two chain-dotted lines $M^1$ and $M^2$. The circuit $M^1$ comprises a radially extending portion of the disc 24, the lug 25, the air gap between the latter and the core 29, the top portion of the latter, the bar 21, and the air gap over a large area between the edge of this bar and the disc 24. The circuit $M^2$ is constituted in a similar manner and is closed by the other lug 26. Each of these magnetic circuits therefore passes through the bar 21, which has sufficient thickness to avoid becoming saturated.

The movable armature, consisting of the disc 24 and its lugs 25 and 26, is free to oscillate between two positions. In the first position the lug 25 is opposite the end 27 of the core 29, and in the second position the lug 26 is opposite the other end 28 of the core. A spring 31 which is connected to the disc 24 and the bar 21 tends to bring the armature into the aforementioned second position by pivoting it in the direction of arrow $f^1$ (Fig. 4).

In the first magnetic circuit $M^1$, on the core 29, is provided a fine gauge wire coil 32. A heavy gauge wire coil 33 is provided on the other half of the core in the second magnetic circuit $M^2$.

The speed variator includes a switch I having two contact studs 34 and 35 carried by two resilient blades 36 and 37 electrically insulated from each other and supported on the bar 21. The arrangement is such that when the two blades are free the two contact studs 34 and 35 are separated and, further, when the disc is in its mean position as illustrated, these contact studs are in contact owing to the force exerted by a thrust member 38 made of a non-conductive material attached by means of a rivet to the disc 24. The speed variator is completed by a capacitor 40 which is fitted into a hole 41, provided in the bar 21.

The above described speed variator is combined with the motor B in the manner described for the first example. In Fig. 3 there is shown at 42 a plug, at $43^a$ and $43^b$ the field windings of the motor, and at 44 the armature of the latter. The heavy gauge wire coil 33 is in series with the switch I, the field windings $43^a$ and $43^b$, and the armature 44. The fine gauge coil 32 is in parallel with the armature. A rheostat 45, having a slider 46 and a dead stud 47, is connected in series with the coil 32. The capacitor 40 is connected in parallel with the switch I so as to reduce the spark when switching.

The above described assembly operates in the following manner:

If the slider 46 of the rheostat 45 is brought to the dead stud 47, the coil 32 of the speed variator is de-energized and the motor operates without any adjustment, i. e. as a normal motor; for the current in the coil 33 attracts the lug 26 and in combination with the action of the spring 31 turns the disc 24 in the direction of arrow $f^1$ and thereby closes the switch I. When the speed variator A is to be brought into action, the current in the coil 32 is adjusted by means of the rheostat 45 so that under the action of the two opposing torques exerted on the disc 24 by the two coils 32 and 33, and the torque due to the tension of the spring 31, the vibrator functions at a frequency corresponding to the required speed of rotation of the motor B when overcoming the resistant torque of the device C which the motor is adapted to drive.

It will be understood that when the flux in the magnetic circuit $M^1$ of the vibrator attains such value that the torque resulting from the attraction exerted by the core on the lug 25 exceeds the combined effect of the torque due to the attraction exerted by the other end of the core on the lug 26 and the torque due to the spring 31, the disc 24 pivots in the opposite direction to that of the arrow $f^1$. As soon as the abutment ceases to bear against the blade 37 the two contact studs of the switch I separate and the motor circuit is opened. The differential action of the two coils immediately ceases and, under the action of the return spring 31, the disc 24 turns in the direction of the arrow $f^1$ and once more closes the switch I, and so on. It is clear that the frequency or rate of opening and closing of the switch depends on the difference between the torques exerted on the disc 24 by the two magnetic circuits $M^1$ and $M^2$. The smaller this difference, the higher is this frequency.

If owing to a heavier load the speed of the motor B decreases, the current in the winding 33 increases, the differential action exerted by the electromagnets on the disc decreases, and the frequency of the opening and closing of the switch increases. Hence the energy supplied to the motor B increases, the motor torque increases and the motor resumes the speed for which it was set (within the limits of motor slip). If it is desired to change the speed of the motor or in other words the frequency of the vibrator, it suffices to adjust the rheostat 45. Alternatively, or in addition, the length of the air gaps or the tension of the spring may be adjusted.

It will be observed that in the two foregoing embodiments of the invention the shunt coil of the vibrator is connected in parallel with the armature of the motor. In this way the voltage across this coil varies in the direction of the action this coil has to exert. In a universal motor, if the load is increased the voltage across the armature decreases while the voltage across the field winding increases. However, the arrangement described is not essential, the control coil may be for instance connected to the terminals of the motor.

The device shown in Figs. 3 to 6 functions therefore in the same manner as the first embodiment and possesses in addition to the advantages of the latter various further features permitting:

1. A static equilibrium of the vibrating member since the latter, which is composed of the disc 24 and the diametrally opposed lugs 25, 26, is in indifferent equilibrium about the axis of the journal 23.

2. A considerable reduction in the weight of one of the coils owing to the fact that these coils are not superposed, which arrangement permits a shortening of the length of the turns of the coil which is in practice superposed on the other when the two coils are situated, as in the first embodiment, in the same magnetic circuit.

3. A complete independence of the two coils in the sense that the intensity of the current in each coil is not influenced by a change in the field pertaining thereto under the influence of a change in the other current, as is the case when the two coils are situated in the same magnetic circuit; for an increase in the current in the heavy gauge wire coil results in a decrease in the differential field and this decrease in turn results in an increase in the current in the fine gauge wire coil which may cause the latter to become overheated.

4. A good magnetic circuit, since the air gap between the disc 24 and the support bar 21 extends over the entire lateral face of this bar. The total reductance of the two circuits is reduced and the necessary ampere-turns may be correspondingly reduced.

5. An improved degree of contact between the switch contact studs at full motor load since the action of the coil 33, at that moment preponderant, is in the direction of that of the spring 31 for closing and holding closed the switch I.

6. The elimination of any risk of the field reversing in the event of an overloaded motor. The coil 33, which at that moment becomes preponderant, continues to act in the same direction, i. e. that for closing the switch I, whereas if the two coils are disposed, as in the first example, in the same magnetic circuit, thereby creating a differential field, this field may change in direction if the subtractive field becomes greater than the other field and cause a premature opening of the switch.

Although specific embodiments of the invention have been described hereinbefore, it is to be understood that many changes and modifications may be made therein without departing from the spirit and scope of the invention as hereinafter claimed.

Having now described my invention what I claim as new and desire to secure by Letters Patent is:

1. Speed variator for an electric motor, said variator comprising in combination: an electric switch adapted to control the electric supply of said motor; a vibrator adapted to open and close alternately said switch, said vibrator comprising a support bar, a flat face formed on the latter, two magnetic cores oppositely mounted on said bar, in coaxial relation to each other, a disc oscillatably mounted on said support bar, adjacent said flat face of said support bar and comprising two lugs each one of which cooperates with the adjacent end of one of said cores, said disc being adapted to oscillate between a first position in which it causes the closure of said switch and a second position in which the switch is open, an elastic device for biasing said disc to one of said two positions, two coils disposed on said two cores, respectively, said coils having different numbers of turns and being adapted for creating two fields in said two cores, respectively, said fields creating a differential torque which acts upon said oscillable disc; and an adjusting device for adjusting as desired the energization of one of said coils and thereby the frequency of oscillation of said disc.

2. Speed variator for an electric motor, said variator comprising in combination: an electric switch adapted to control the electric supply of said motor; a vibrator adapted to open and close alternately said switch, said vibrator comprising a support bar, a flat face formed on the latter, two magnetic cores formed by the two halves of a piece engaged in an aperture provided in said bar and protruding respectively on opposite faces of said support bar, a disc, a journal fixed on and perpendicular to said disc, rotatively mounted in said support bar and perpendicular to the axis of said aperture, said disc being adjacent said flat face of said support bar and comprising two lugs each of which cooperates with the adjacent end of one of said cores, and said disc being adapted to oscillate between a first position in which it causes the closure of said switch and a second position in which the switch is open, an elastic device for biasing said disc to one of said two portions, two coils disposed on said two cores, respectively, said coils having different numbers of turns and being adapted for creating two fields in said two cores, respectively, said fields creating a differential torque which acts upon said oscillable disc; and an adjusting device for adjusting as desired the energization of one of said coils and thereby the frequency of oscillation of said disc.

3. Speed variator for an electric motor, said variator comprising in combination: an electric switch adapted to control the electric supply of said motor; a vibrator adapted to open and close alternately said switch, said vibrator comprising a support bar supporting said switch, a flat face formed in said support bar, two magnetic cores formed by the two halves of a piece engaged in an aperture provided in said bar, and protruding respectively on opposite faces of said bar, a disc, a journal fixed on and perpendicular to said disc, rotatively mounted in said support bar and perpendicular to the axis of said aperture, said disc being adjacent said flat face of said support bar and comprising two lugs each one of which cooperates with the adjacent end of one of said cores, an elastic device for biasing said disc in a given direction of rotation, two coils disposed on said two cores, respectively, said coils having different numbers of turns and being adapted for creating two fields in said two cores, respectively, said fields creating a differential torque which acts upon said oscillable disc, a projection on said disc adapted to close said switch when said disc rotates in said given direction under the combined action of said elastic device and the attraction exerted on one of said lugs by the field created by the corresponding coil; and an adjusting device for adjusting as desired the energization of one of said coils and thereby the frequency of oscillation of said disc.

4. The combination of an electric motor which includes field windings, an armature, two current receiving terminals and an electric supply circuit connecting these terminals to said field windings and to said armature, and a variator for variating the speed of said motor, said variator comprising in combination: an electric switch adapted to control the electric supply of said motor; a vibrator adapted to open and close alternately said switch, said vibrator comprising a support bar, a flat face formed on the latter, two magnetic cores oppositely mounted on said bar, in coaxial relation to each other, a disc oscillatably mounted on said support bar, adjacent said flat face of said support bar and comprising two lugs each one of which cooperates with the adjacent end of one of said cores, said disc being adapted to oscillate between a first position in which its causes the closure of said switch and a second position in which the switch is open, an elastic device for biasing said disc to one of said two positions, two coils disposed on said two cores, respectively, said coils having different numbers of turns and being adapted for creating two fields in said two cores, respectively, said fields creating a differential torque which acts upon said oscillable disc, one of said coils being connected in series in said supply circuit and the other coil being connected in parallel with a portion of said circuit which comprises at least said motor armature; and an adjusting device for adjusting as desired the energization of one of said coils and thereby the frequency of oscillation of said disc.

5. The combination as claimed in claim 4 wherein the coil that is in parallel with at least said armature is the coil that has the greatest number of turns and this coil is, firstly, so wound as to create a torque acting in a direction opposed to said elastic device, said direction being such that it corresponds to the direction in which said oscillable disc moves to open said switch, and, secondly, is combined with said adjusting device.

References Cited in the file of this patent

UNITED STATES PATENTS 2,376,522    Storm _____ May 22, 1945